No. 737,341. PATENTED AUG. 25, 1903.
A. C. CAMPBELL.
MACHINE FOR FORMING GARMENT HOOKS.
APPLICATION FILED APR. 24, 1903.
NO MODEL. 10 SHEETS—SHEET 1.

Fig 1

Witnesses
C. F. Kilgore
Ethel M. Lowe

Inventor
Andrew C. Campbell, by
Harry P. Williams
Attorney

No. 737,341. PATENTED AUG. 25, 1903.
A. C. CAMPBELL.
MACHINE FOR FORMING GARMENT HOOKS.
APPLICATION FILED APR. 24, 1903.
NO MODEL. 10 SHEETS—SHEET 3.

No. 737,341. PATENTED AUG. 25, 1903.
A. C. CAMPBELL.
MACHINE FOR FORMING GARMENT HOOKS.
APPLICATION FILED APR. 24, 1903.
NO MODEL. 10 SHEETS—SHEET 4.

No. 737,341. PATENTED AUG. 25, 1903.
A. C. CAMPBELL.
MACHINE FOR FORMING GARMENT HOOKS.
APPLICATION FILED APR. 24, 1903.
NO MODEL. 10 SHEETS—SHEET 6.

Witnesses
C. F. Kiegor
Ethel M. Lowe

Inventor
Andrew C. Campbell, by
Harry P. Williams,
Attorney

No. 737,341. PATENTED AUG. 25, 1903.
A. C. CAMPBELL.
MACHINE FOR FORMING GARMENT HOOKS.
APPLICATION FILED APR. 24, 1903.
NO MODEL. 10 SHEETS—SHEET 7.

Fig. 15

Witnesses
C. F. Kilgore
Ethel M. Lowe.

Inventor
Andrew C. Campbell, by
Harry F. Williams
Attorney

No. 737,341. Patented August 25, 1903.

UNITED STATES PATENT OFFICE.

ANDREW C. CAMPBELL, OF WATERBURY, CONNECTICUT, ASSIGNOR TO THE E. J. MANVILLE MACHINE COMPANY, OF WATERBURY, CONNECTICUT, A CORPORATION OF CONNECTICUT.

MACHINE FOR FORMING GARMENT-HOOKS.

SPECIFICATION forming part of Letters Patent No. 737,341, dated August 25, 1903.

Application filed April 24, 1903. Serial No. 154,037. (No model.)

*To all whom it may concern:*

Be it known that I, ANDREW C. CAMPBELL, a citizen of the United States, residing at Waterbury, in the county of New Haven and State of Connecticut, have invented certain new and useful Improvements in Machines for Forming Garment-Hooks, of which the following is a specification.

This invention relates to a machine for forming garment-hooks from a continuous length of wire.

The object is to produce a machine which will form perfect hooks with a "hump" in the tongue very rapidly.

The machine that is illustrated has mechanisms for intermittently feeding and cutting off the required length of wire, a horizontally-movable die and a vertically-movable die for blanking each length, a vertically-movable anvil and punch for stamping a hump near one end of each blank, horizontally-movable fingers for bending both ends of each blank so as to form thread-eyes, a horizontally-movable die and vertically-movable die for folding the blank at the middle and bringing the eyes together with the humped tongue between, a transfer mechanism, a vertically-movable swaging punch and anvil for flattening the nose, a reciprocating needle and needle-retainer, a vertically-movable plate for bending the nose upwardly, and a horizontally-movable finger for bending the nose over the needle and completing the hook.

Figure 1:
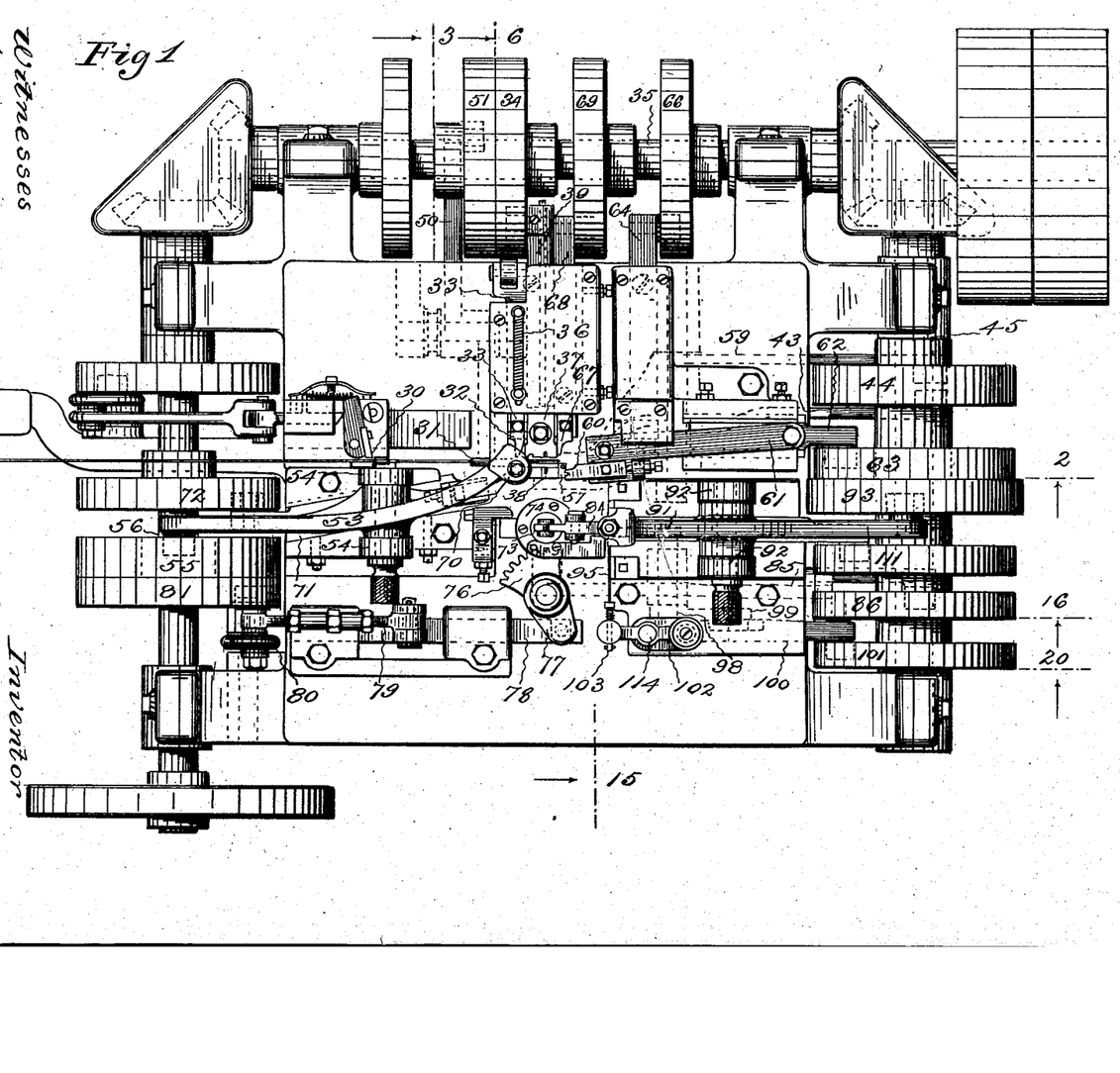
Figure 1 of the accompanying drawings is a plan of the entire machine.

The wire of brass or other suitable metal of the desired diameter and temper is fed into the machine from the left by any ordinary mechanism 30, Fig. 1, which will intermittently feed the desired length of wire at the proper time.

Figure 9:
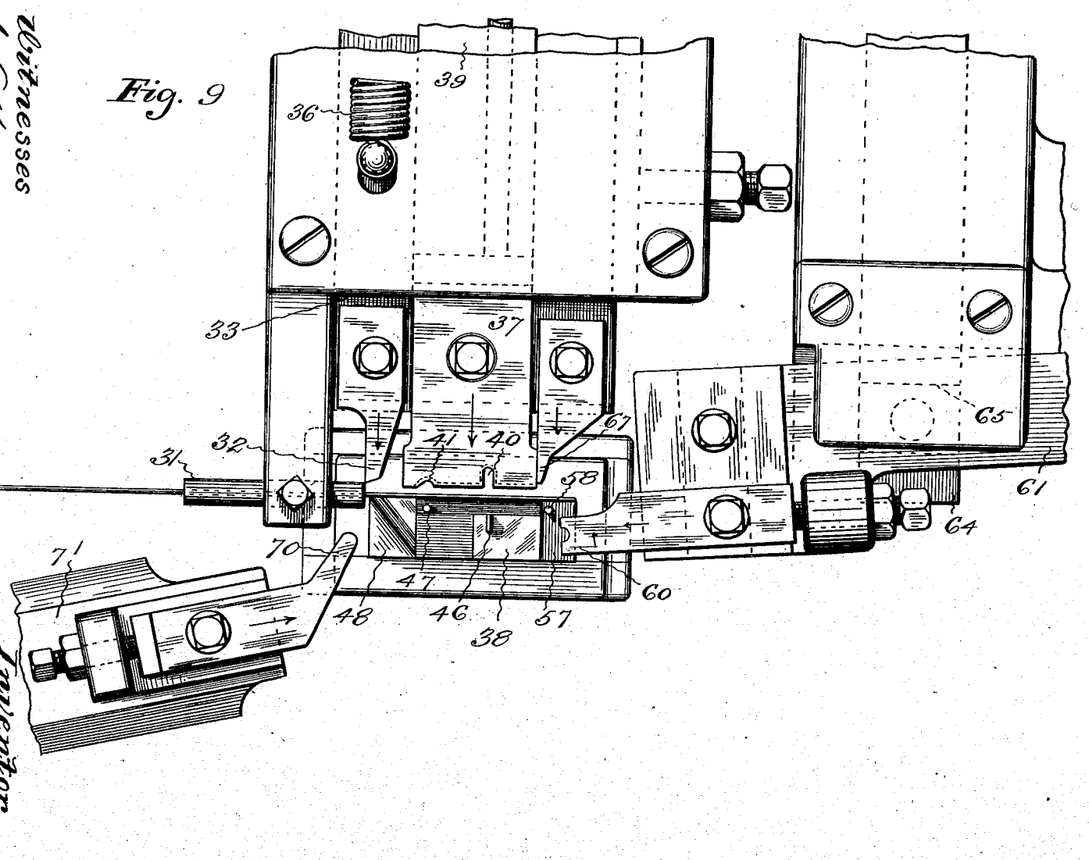
Fig. 9 is a plan of the cutter, the horizontally-movable die, the vertically-movable die, the humping-anvil, and the folding-fingers in the positions occupied when the wire has just been fed between the dies.

At the right of the wire-guiding quill 31 is a cutter 32, that is mounted upon a slide 33, that is thrust forward for severing a length of wire by a cam on the periphery of the disk 34 on the shaft 35 at the back of the machine and is drawn back by a spring 36, Figs. 1 and 9.

The wire is fed in front of a horizontally-movable die 37 and back of a vertically-movable die 38, Fig. 1. The horizontally-movable die is adjustably mounted upon a slide 39, that has a roll which engages a cam-groove in the disk 34, Figs. 1 and 6. In the front face of the horizontal die is a mortise 40 and a recess 41, Fig. 9. The vertically-movable die is on a slide 42, that is engaged by the lever 43, that has a roll engaging a cam-groove in the disk 44, Figs. 2 and 6, on the shaft 45 at the right of the machine. On the top of the vertical die opposite the mortise in the horizontal die is a folding-rib 46, and opposite the recess in the horizontal die is a pin 47, Fig. 9.

Figure 10:
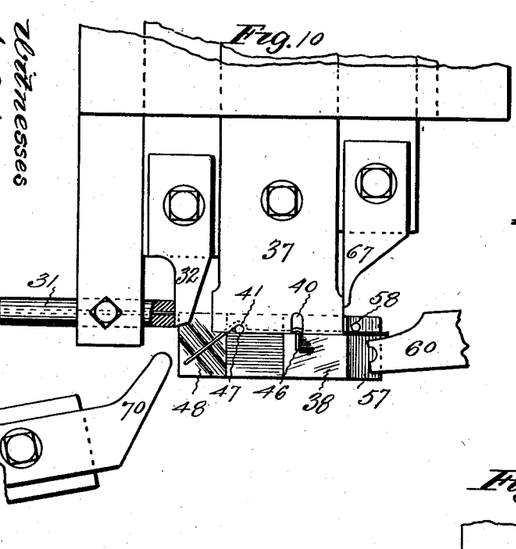
Fig. 10 is a plan of the same parts with the horizontally-movable die moved forward and bending one end of the wire over the humping-anvil.

After a length of wire has been fed the cutter is moved forward to cut it off. At the same time the horizontal die is moved forward and forces the wire against the vertical die. This causes the pin 47 to jam the wire into the recess 41 and make a reëntrant-bend and turn the end forwardly substantially forty-five degrees over the vertically-movable anvil 48, Fig. 10. The vertically-movable anvil is on a slide 49, that is engaged by a lever 50, which has a roll that engages a cam-groove in the disk 51 on the back shaft 35, Figs. 2 and 3.

Figure 4:
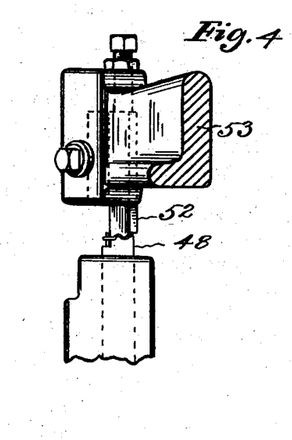
Fig. 4 is a detail view of the humping punch and anvil.
Figure 5:
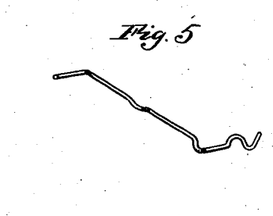
Fig. 5 shows a humped blank.

Above the anvil 48 at the left of the vertical die is a vertically-reciprocating punch 52. This punch is adjustably attached to the end of the lever 53, that is pivoted between ears 54 on the top of the bed, Fig. 2. The punch-lever is curved and has a roll which engages a cam-groove in the disk 55 on the shaft 56 at the left of the machine, Fig. 1. After the left end of the wire has been bent forwardly at an angle the punch is moved downwardly and the anvil is moved upwardly, so as to crimp that end of the wire and form the hump and turn up the end, Figs. 4 and 5. At the right of the vertical die is a vertical slide 57, bearing a pin 58. This slide is engaged by a lever 59, that has a roll engaging a cam-groove in the disk 44 on the shaft 45, Fig. 2. After the horizontal die has pressed the wire against the vertical die this pin is raised. The right end of the wire that projects in front of the pin 58 is then bent backwardly by the rearward movement of the finger 60, Fig. 11.

Figure 2:
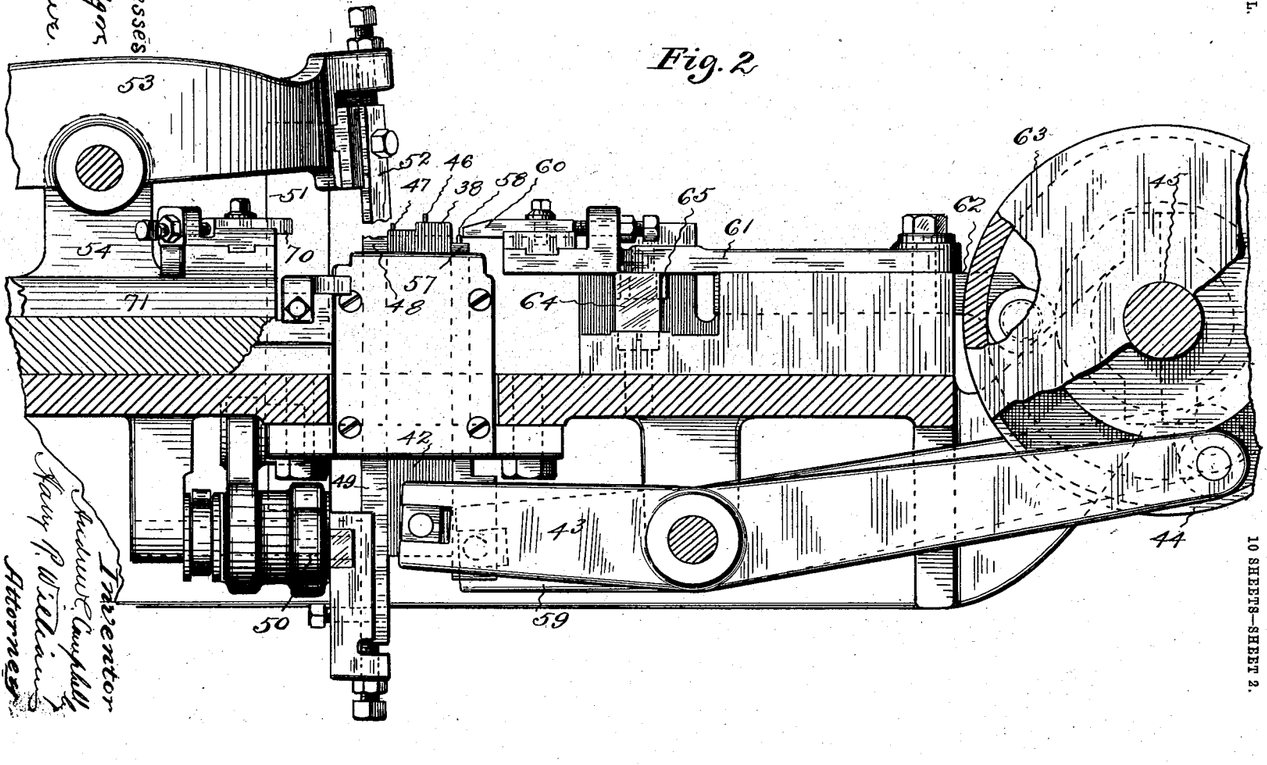
Fig. 2 shows on larger scale a front elevation of the humping punch and anvil, the vertically-movable die, and one eye-bending finger and their operating means, the section being taken on the plane indicated by the dotted line 2 on Fig. 1 looking in the direction indicated by the arrow.
Figure 3:
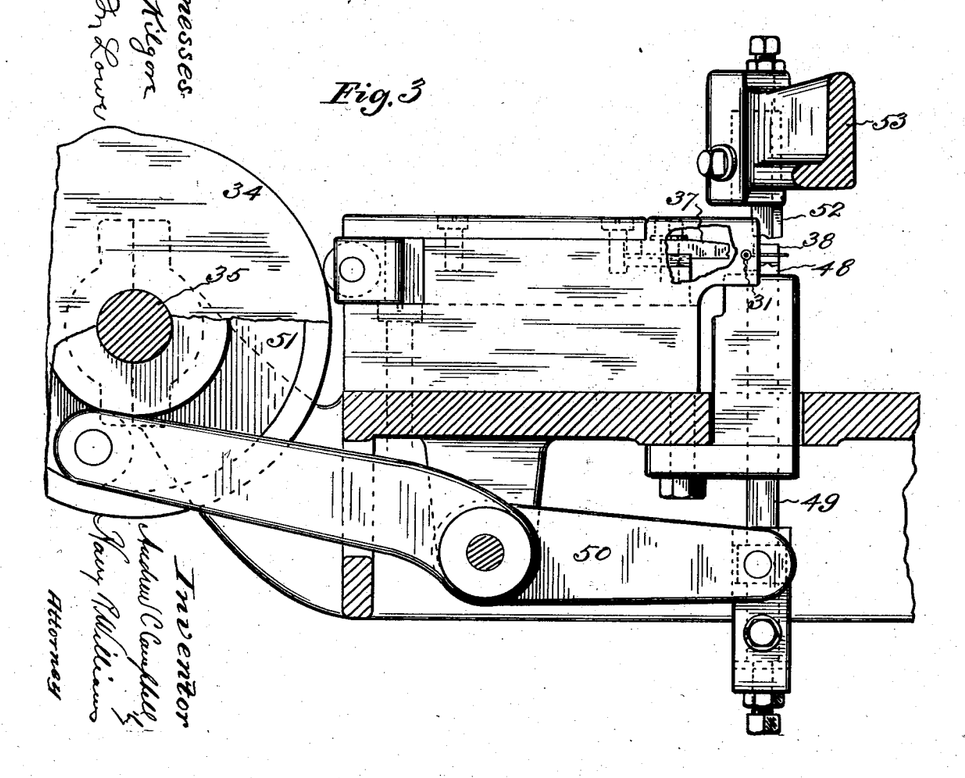
Fig. 3 shows a side elevation of the humping punch and anvil and the horizontally-movable die and operating means, the section being taken on the plane indicated by the dotted line 3 on Fig. 1 looking in the direction indicated by the arrow.

The finger 60 is adjustably mounted on the swinging arm 61, that is pivoted to the slide 62, which has a roll that engages with a cam-groove in the disk 63 on the shaft 45 at the right of the machine, Figs. 1 and 2. The swinging arm has a block 65, that lies in a groove in a slide 64, Figs. 2 and 9. The slide 64 has a roll that engages a cam-groove in the disk 66 on the back shaft 35, Figs. 1 and 15.

Figure 11:
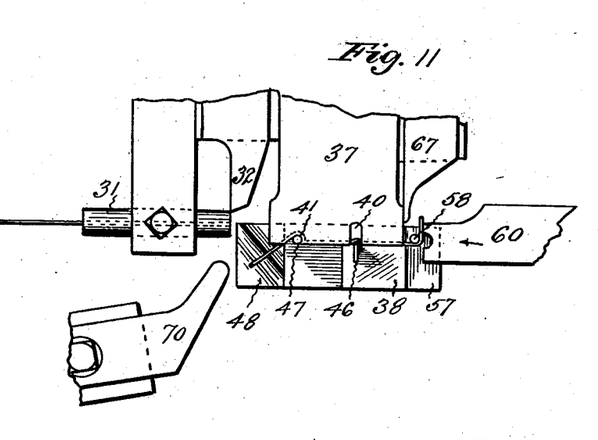
Fig. 11 is a plan of the same parts with one finger moved back and bending one end of the wire rearward.
Figure 12:
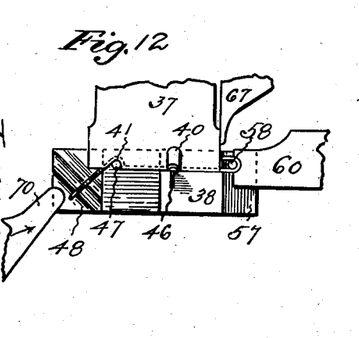
Fig. 12 is a similar view showing the end of the wire over the anvil humped and the other end folded back of the eye-pin by the sidewise movements of the finger which bent that end toward the rear.
Figures 13, 14:
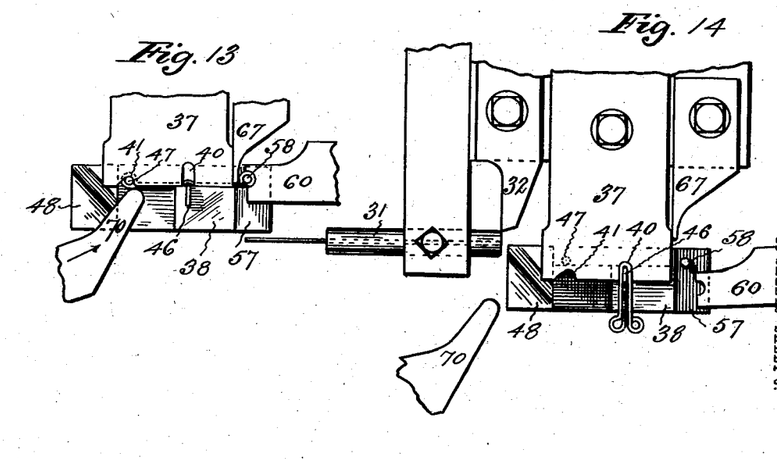
Fig. 13 is a similar view with the humped end bent sidewise by the oblique movement of a finger for completing the eye at one end of the blank and the other end of the wire bent forward by the forwardly-moving finger at the side of the horizontal die for completing the eye at that end of the blank.
Fig. 14 shows a similar view of the same parts in the positions occupied after the horizontal die has moved forwardly a second time and folded the blank about the folding-rib on the vertical die.

The cams are so timed that after the pin 58 has been raised the finger 60 is first drawn backwardly by the back cam 66, so as to bend the end of the wire toward the back, Fig. 11, and then the finger is moved toward the left, so as to bend the end of the wire toward the left around the pin, Fig. 12. Then the finger 67, that is at the right of the horizontal die, is moved forwardly, so as to bend the end of the wire around the pin toward the front and complete the eye, Fig. 13. The finger 67 is mounted on a slide 68, which has a roll that engages a cam-groove in the disk 69 on the back shaft, Fig. 1. While this eye is being formed the punch 52 and anvil 48 are opened out of the way and the vertical die 38 is lowered a short distance, but not enough to draw the pin 47, which it carries, from in front of the wire. After the die has been lowered the end of the wire which has been humped and turned up is engaged by the finger 70, which is adjustably mounted on the obliquely-arranged slide 71, that has a roll which engages a cam-groove in the disk 72 on the shaft 56 at the left of the machine, Figs. 1 and 2. The movement of this finger bends the humped end of the wire around the pin 47 on the vertically-movable die, so as form a loop and leave that end of the wire at about the middle of the blank, Fig. 13.

The vertically-movable front die 38 and slide 57 at the right are then lowered, so as to withdraw the pins 47 and 58 from the eyes. After the pins have been removed from the eyes the horizontal die 37 is given another forward movement. This causes the blank to be doubled on itself about the folding-rib 46 on the vertical die, Fig. 14.

In front of the vertically-movable die is a hub 73. Mounted on this hub is a sleeve 74, which has gear-teeth 75, Figs. 6 and 16.

Figures 21, 22, 23, 24:
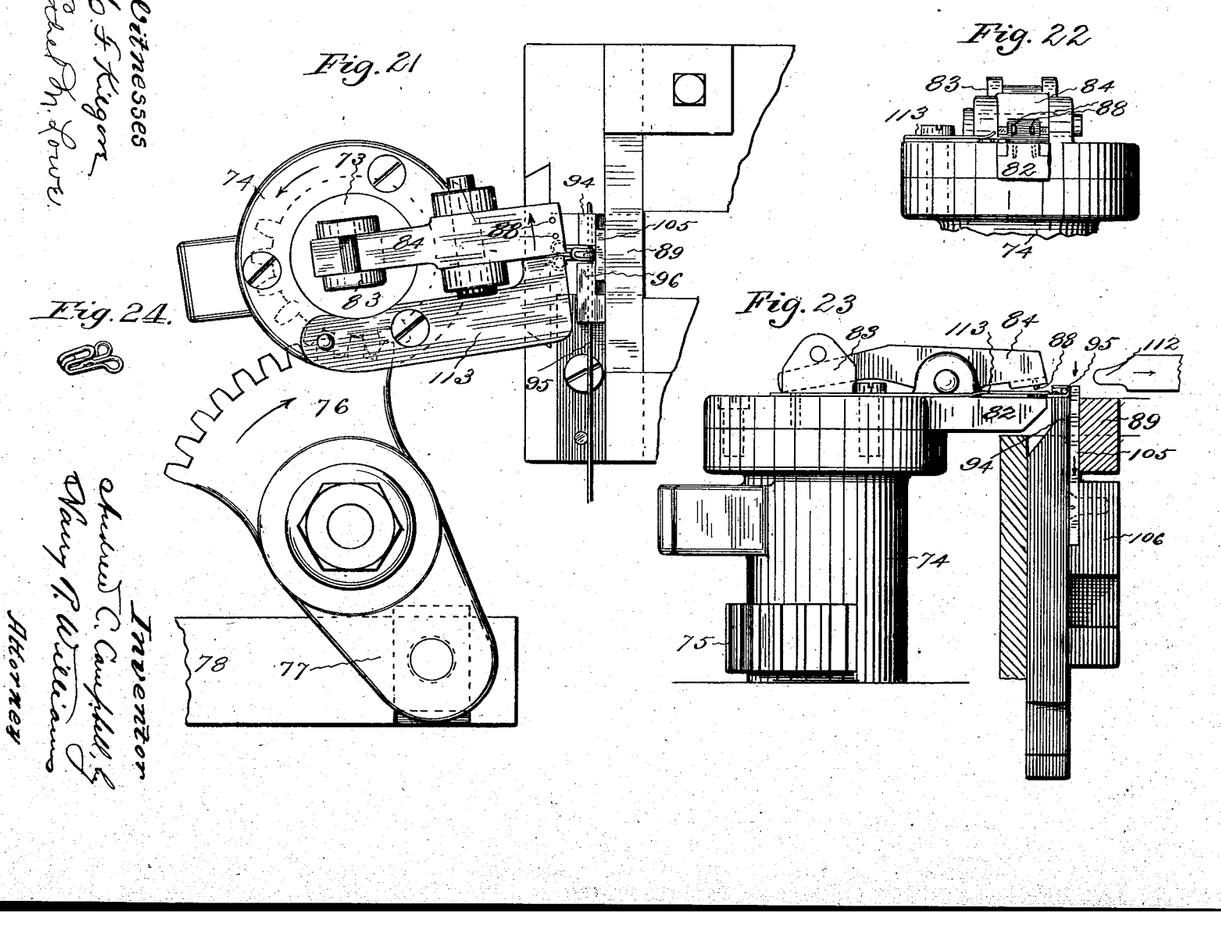
Fig. 21 shows a plan of the transfer mechanism, swaging-anvil, bending-plate, needle, and the needle-retainer.
Fig. 22 is a view looking into the transfer-jaws.
Fig. 23 is an elevation of the transfer mechanism, bending-plate, folding-finger, and needle-retainer in the positions occupied after the hook has been completely formed and is being released.
Fig. 24 is a view of the hook formed on this machine.

These teeth mesh with teeth on the segment 76 at the end of a lever 77, Figs. 1 and 21. The lever 77 is engaged by a slide 78, that by an adjustable link 79 is connected with a lever 80, that has a roll which engages a cam-groove in the disk 81 on the shaft 56 at the left of the machine, Fig. 1. Projecting from one side of the sleeve 74 is a fixed jaw 82. Extending through the hub is a vertically-movable spindle 83, the upper end of which is connected with one end of the movable jaw 84, Fig. 16. This spindle rotates with the jaws and sleeve, but has a vertical movement independent of the sleeve and hub for opening the jaws. The lower end of the spindle is engaged by a lever 85, that has a roll engaging a cam-groove in the disk 86 on the shaft 45 at the right, Figs. 6 and 16.

Figures 6, 7, 8:
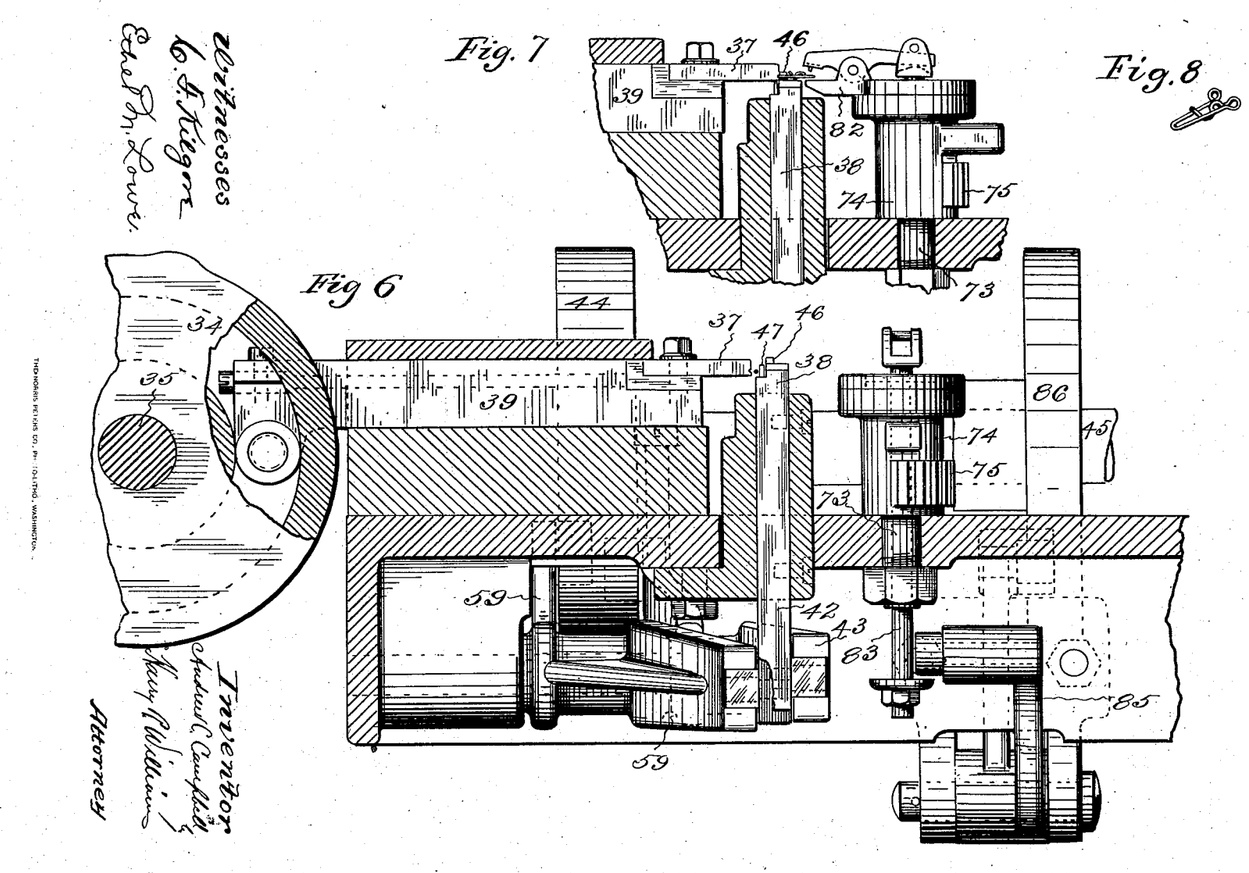
Fig. 6 is a side elevation of the horizontally-movable and vertically-movable dies and their operating means, also a part of the transfer mechanism, the section being taken on the plane indicated by the dotted line 6 on Fig. 1 looking in the direction indicated by the arrow.
Fig. 7 is a side elevation of these parts with the horizontally-movable die forward and the transfer mechanism ready to grasp a folded blank.
Fig. 8 shows a folded blank.
Figure 15:
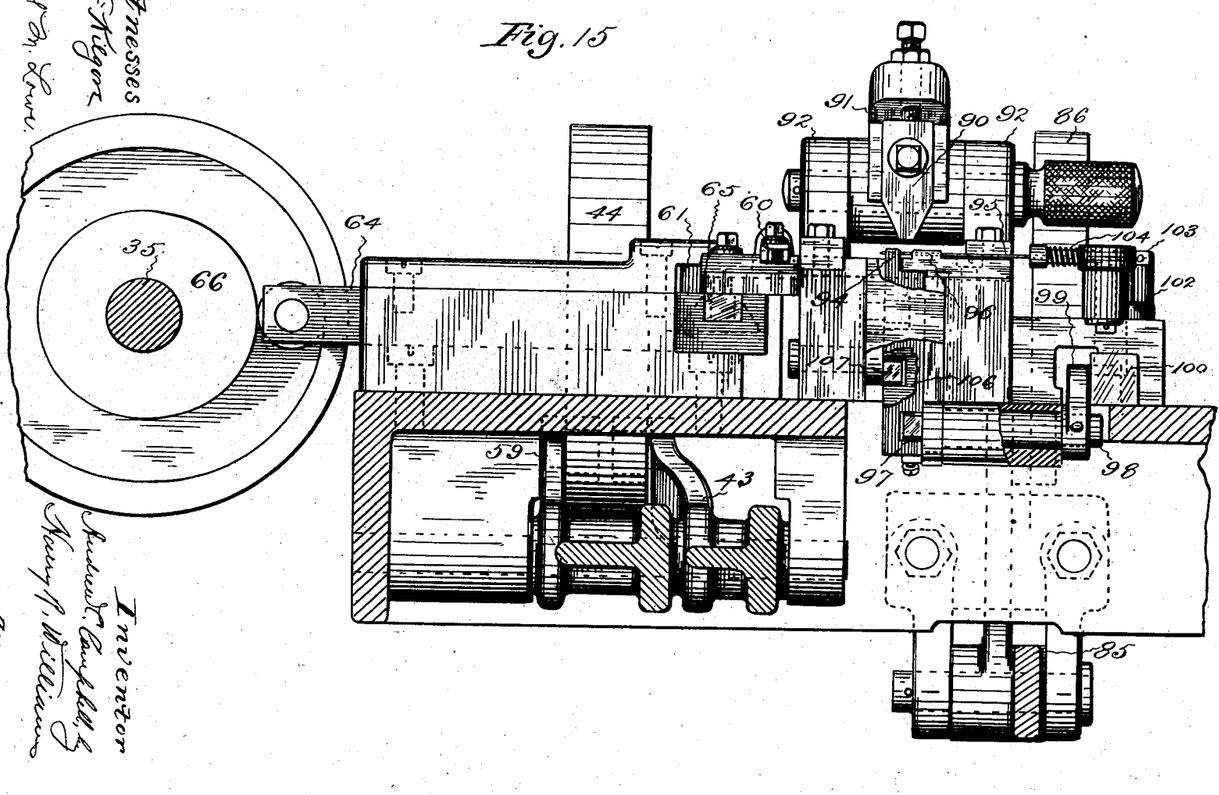
Fig. 15 is an elevation showing the swaging-punch, the needle, and the needle-retainer and operating means, the section being taken on the plane indicated by the dotted line 15 on Fig. 1 looking in the direction indicated by the arrow.
Figures 16, 17, 18, 19:
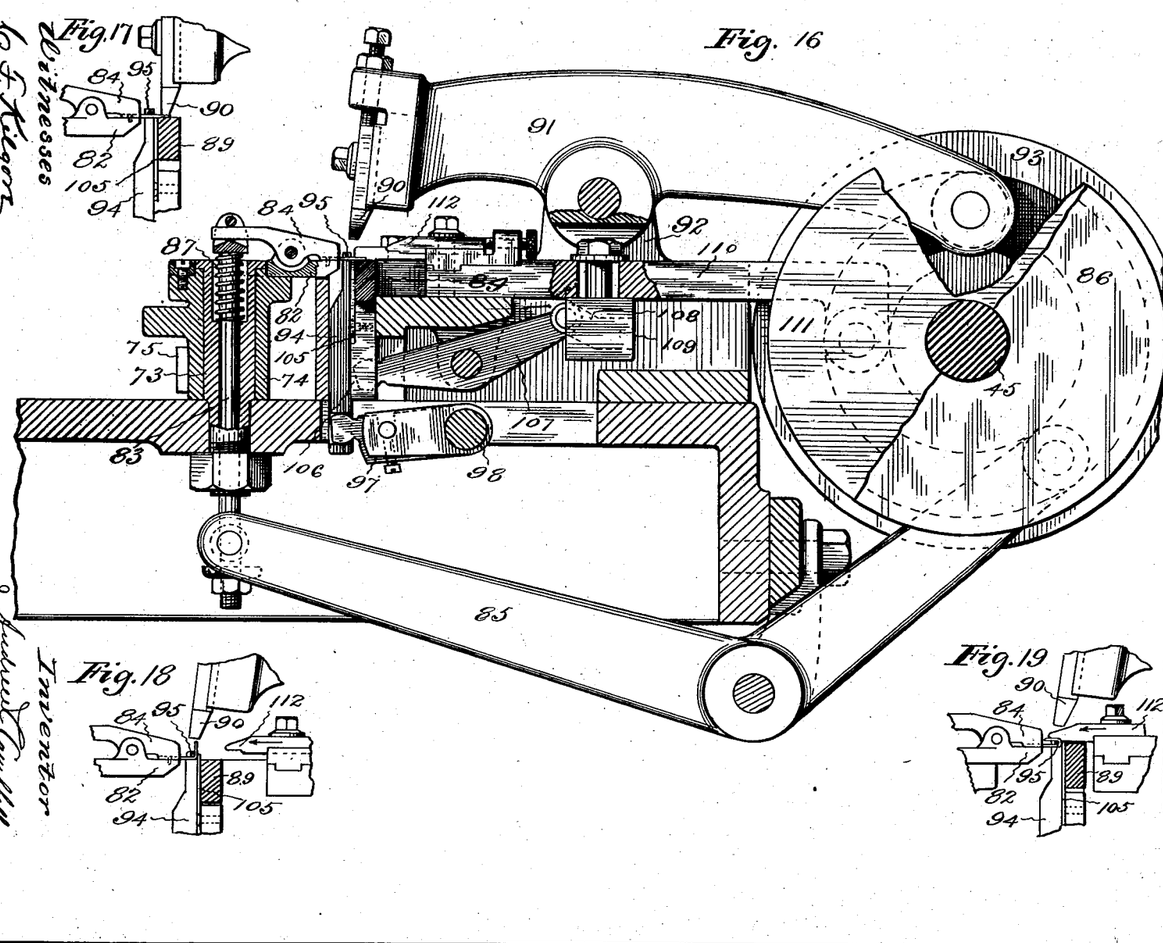
Fig. 16 is a front elevation of the transfer mechanism, the swaging anvil and punch, the bending-plate, and the bending-finger, with their operating means, the section being taken on the plane indicated by the dotted line 16 on Fig. 1 looking in the direction indicated by the arrow.
Fig. 17 is a view of the anvil and punch in the act of swaging the nose of a blank that is held in the transfer-jaws.
Fig. 18 is a view showing the nose bent upwardly by the lifting of the bending-plate.
Fig. 19 is a view showing the nose bent over by the sidewise movement of the bending-finger.

The cams for rotating the sleeve and reciprocating the spindle are so timed that after the blank has been doubled and the eyes folded together by the second forward movement of the horizontal die the jaws are rotated rearwardly in their open position, and when the shank of the blank is between them, Fig. 7, the upper jaw is closed against the lower jaw by the spring 87, Fig. 16. The upper jaw has a pair of teeth 88, Fig. 22, that pass through the eyes when the blank is grasped by the jaws. After the blank has been grasped by the jaws in this manner the sleeve is rotated, so that the jaws will carry the blank forwardly and place the end of the nose over an anvil 89, Fig. 16. Above the anvil is a swaging-punch 90, mounted on the end of a vertically-movable lever 91, that is pivoted between ears 92, secured to the top of the bed, and that has a roll which engages a cam-groove in the disk 93 on the shaft 45 at the right of the machine, Figs. 1 and 16. When the nose is laid upon the anvil, the punch strikes and flattens out the end and sets the metal at the bend, Fig. 17. As the swaging-punch is lifted a vertical slide 94, Figs. 15, 21, 23, just back of the blank, is raised. After this slide has been lifted a needle 95 is thrust rearwardly through its guide 96 into a perforation in the upper end of the slide, Figs. 15, 21. The needle passes over substantially the middle of the blank, so that the blank is held below the needle between the guide and slide through which the rod projects.

Figure 20:
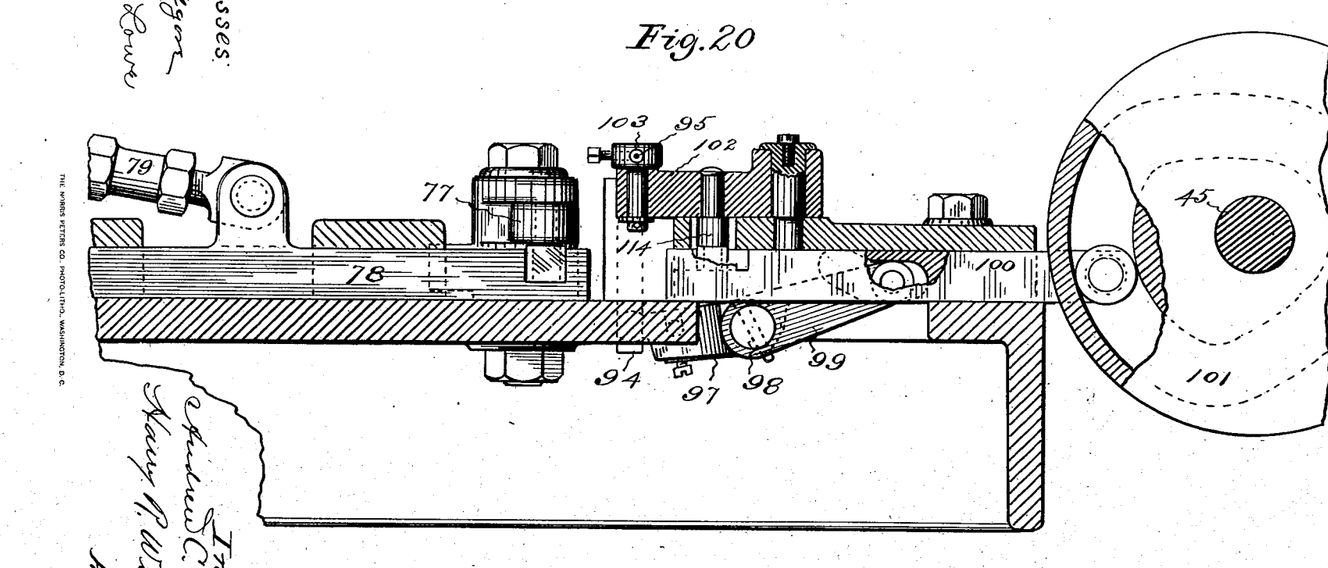
Fig. 20 is a section showing a part of the transfer mechanism and the needle and needle-retainer-operating means, the section being taken on the plane indicated by the dotted line 20 on Fig. 1 looking in the direction indicated by the arrow.

The vertical slide 94 is engaged by the rocker-arm 97 on a shaft 98, Figs. 15 and 16, that has a rocker-arm 99, which engages an inclined groove in a slide 100, that has a roll engaging a cam-groove in the disk 101 on the shaft 45, Fig. 20. The slide 100 also has an oblique groove, entering which is a stud 114, projecting from a lever 102, that carries the needle 95, Fig. 20. The needle is held in a sleeve 103, which is thrust rearwardly by a spring 104, Fig. 15.

The horizontal slide 100 and cam 101 lift the vertical slide 94 in advance of the needle, so the perforation will be in position to receive the needle when it is thrust backwardly. After the operations have been completed the needle is first drawn out, and then the slide is lowered. As the needle and needle-retainer are operated by the same cam, they always work in conjunction, and should a piece of wire or an improperly-formed blank prevent the entrance of the needle into the perforation in the needle-retainer the spring will yield, so that the needle will not be damaged. After the needle has been pushed rearwardly over a blank a plate 105, that lies between the anvil and the needle-guide, is raised and bends the end of the nose upwardly, Fig. 18. This plate is on a vertical slide 106, that is engaged by a lever 107, which has a roll lying in an inclined groove 108 in a block 109, that depends from a horizontal slide 110, that has a roll which engages a cam-groove in the disk 111 on the shaft at the right of the machine, Fig. 16.

Adjustably mounted on the slide 110 is a finger 112, Fig. 16. After the plate has turned up the nose the finger 112 engages the nose and pushes it over around the needle toward the left and completes the hook, Fig. 19. As the plate and this finger are operated by the same slide, they must of necessity act in proper relation.

After the hook has been formed the jaws are opened and rotated rearwardly, the finger is withdrawn, the plate is lowered, the needle is drawn toward the front, and the needle-retainer is lowered. The finished hook then drops out of the machine into a receptacle below. To prevent the tools from dragging the hook around the needle, a stripper-plate 113 is attached to the lower jaw, so as to lie over the eyes of the hook until all of the tools have been withdrawn, Figs. 21, 22, 23.

While the jaws are transferring a blank that has been doubled from the forming-dies to the swaging-anvil another length of wire is being fed into the machine, so that while the swaging-dies and the hook-bending tools are operating upon the blank the following piece of wire is being blanked and provided with eyes.

This machine forms what is known as the "hump hook" in a very rapid and sure manner. The operations of the mechanisms are positive and all are adjustable, so that the hooks are formed very accurately, and there is no lost time or unnecessary mechanism, so that the hooks are produced rapidly with but little power.

I claim as my invention—

1. A hook-forming machine having mechanism for intermittently feeding the wire, mechanism for cutting the wire into lengths, a horizontally-movable die with a folding-mortise and a vertically-movable die with a folding-rib for bending the wire, an anvil and punch for "humping" one end, a horizontally-movable finger for doubling the humped end and forming an eye, horizontally-movable fingers for forming an eye at the other end, an anvil and punch for swaging the nose, an oscillating arm with a gripping-jaw for transferring the blank to the swaging anvil and punch, a needle for holding the blank, a plate for bending the nose out of the plane of the shank, and a finger for bending the nose over the shank, substantially as specified.

2. A hook-forming machine having mechanism for intermittently feeding the wire, mechanism for cutting the wire into lengths, a horizontally-movable die with a folding-mortise and a vertically-movable die with a folding-rib for bending the wire, an anvil and punch for "humping" one end, a horizontally-movable finger for doubling the humped end and forming an eye, horizontally-movable fingers for forming an eye at the other end, an anvil and punch for swaging the nose, an oscillating arm with a gripping-jaw for transferring the blank to the swaging anvil and punch, and mechanism for bending the nose over the shank, substantially as specified.

3. A hook-forming machine having mechanism for intermittently feeding the wire, mechanism for cutting the wire into lengths, a horizontally-movable die with a folding-mortise and a vertically-movable die with a folding-rib for bending the wire, a vertically-movable anvil and a vertically-movable punch over the anvil for "humping" one end, a horizontally-movable finger for doubling the humped end and forming an eye, horizontally-movable fingers for forming an eye at the other end, an anvil and punch for swaging the nose, an oscillating arm with a gripping-jaw for transferring the blank to the swaging anvil and punch, and mechanism for bending the nose over the shank, substantially as specified.

4. A hook-forming machine having mechanism for intermittently feeding the wire, mechanism for cutting the wire into lengths, a horizontally-movable die with a folding-recess and a vertically-movable die with a folding-rib for bending the wire, an anvil and punch for "humping" one end, a horizontally-movable finger for doubling the humped end and forming an eye, a vertically-movable pin adjacent to the vertically-movable die, horizontally-movable fingers for bending one end around the vertically-movable pin and forming an eye, an anvil and punch for swaging the nose, an oscillating arm with a gripping-jaw for transferring the blank to the swaging anvil and punch, and mechanism for bending the nose over the shank, substantially as specified.

5. A hook-forming machine having mechanism for intermittently feeding the wire, mechanism for cutting the wire into lengths, dies for bending the wire, an anvil and punch for "humping" one end, fingers for forming eyes at the ends of the blank, means for folding the blank and bringing the eyes together, an anvil and punch for swaging the nose, an oscillating arm with a gripping-jaw for transferring the blank to the swaging anvil and punch, a needle for holding the blank, a vertically-movable plate for bending the nose upwardly and a finger for bending the nose over the shank, substantially as specified.

6. A hook-forming machine having mechanism for intermittently feeding the wire, mechanism for cutting the wire into lengths, a horizontally-movable die and a vertically-movable die for bending the wire, an anvil and punch for "humping" one end, fingers for forming eyes at the ends of the blank, an anvil and punch for swaging the nose, a fixed needle-guide one side of the anvil and punch, a vertically-movable needle-retainer the other side of the anvil and punch, a needle movable through the guide on one side into and out of an opening in the needle-retainer on the other side, a plate adjacent to the anvil for bending the nose upwardly and a finger movable over the anvil for bending the nose over the shank, substantially as specified.

7. A hook-forming machine having mechanism for intermittently feeding the wire, mechanism for cutting the wire into lengths, a horizontally-movable die and a vertically-movable die for bending the wire, an anvil and punch for "humping" one end, fingers for forming eyes at the ends of the blank, mechanism for folding the blank and bringing the eyes together, a swaging anvil and punch, means for transferring the blank from the folding mechanism to the swaging anvil and punch, a fixed needle-guide one side of the anvil and punch, a vertically-movable needle-retainer the other side of the anvil and punch, a needle movable through the guide on one side into and out of an opening in the vertically-movable retainer on the other side, a plate adjacent to the anvil for folding the nose upward about the needle and a finger movable with the plate for bending the nose around the needle and over the shank, substantially as specified.

8. A hook-forming machine having feeding and cutting mechanisms, a horizontally-movable die and a vertically-movable die, mechanisms for moving the horizontally-movable die toward the vertically-movable die and bending the cut end of the wire forward substantially forty-five degrees, a vertically-movable anvil and a vertically-movable punch for "humping" the forwardly-bent end of the wire, a finger movable obliquely from the feed side toward the rear for bending the humped end around and forming an eye at one end of the blank, fingers for forming an eye at the other end of the blank, and mechanism for swaging, bending up and turning over the nose, substantially as specified.

9. A hook-forming machine having feeding and cutting mechanisms, a horizontally-movable die with a folding-mortise and a bending-recess and a vertically-movable die with a folding-rib for bending the cut piece, a vertically-movable anvil and a vertically-movable punch on the feed side of the vertically-movable die and adjacent to the cutter for humping an end of the wire, fingers for bending the ends of the wire around eye-forming pins, and mechanism for swaging, bending up and turning over the nose, substantially as specified.

10. A machine for forming hooks, having a horizontally-movable die with a folding-mortise and a bending-recess, a vertically-movable die with an eye-pin in front of the horizontally-movable die, a vertically-movable humping-punch and a vertically-movable anvil on the feed side of the vertically-movable die, a vertically-movable eye-pin at the other side of the vertically-movable die, mechanism for moving the horizontal die forward toward the vertical die, mechanism for lowering the vertical die, mechanism for moving the horizontal die over the vertical die, mechanism for reciprocating the anvil and punch toward and from each other, fingers for bending the wire around the eye-pins, mechanism for still further lowering the vertically-movable die, and mechanism for swaging, bending up and turning over the nose, substantially as specified.

11. A machine for forming hooks having a horizontally-movable die with a folding-mortise and a bending-recess, mechanism for moving the horizontally-movable die forward in two steps and back in one step, a vertically-movable die with a folding-rib and an eye-pin, mechanism for lowering the vertically-movable die in three steps and raising it in one step, a vertically-movable punch and anvil on the feed side of the vertically-movable die, mechanism for moving both the anvil and punch toward and from each other, an eye-pin vertically movable at the other side of the vertically-movable die, mechanism for raising and lowering this eye-pin, fingers for bending the wire about the eye-pins, and mechanism for swaging, turning up and bending over the nose, substantially as specified.

12. A machine for forming hooks having a horizontally-movable die with a folding-mortise and a bending-recess, mechanism for moving the horizontally-movable die forwardly in two steps and backwardly in one step, a vertically-movable die with a folding-rib and an eye-pin, mechanism for moving the vertically-movable die downwardly in three steps and upwardly in one step, a humping anvil and punch on the feed side of the vertically-movable die, mechanism for reciprocating both the anvil and punch toward and from each other, a vertically-movable eye-pin at the other side of the vertically-movable die and mechanism for raising and lowering the eye-pin, substantially as specified.

13. A machine for forming hooks having mechanisms for feeding, cutting, blanking, humping and folding the wire, a swaging anvil and punch for swaging the nose of the blank, a plate movable vertically adjacent to the faces of the swaging-anvil for turning up the nose and a finger movable over the anvil for bending over the nose, substantially as specified.

14. A machine for forming hooks having mechanisms for feeding, cutting, blanking, humping and folding the wire, a needle for holding the blank, a fixed needle-guide, a vertically-movable retainer for the needle, connected mechanism operated by a single cam for moving the needle and retainer in conjunction, a plate for turning the nose upwardly about the needle, a finger for bending the nose over the needle and connected mechanism operated by a single cam for operating the plate and the finger in conjunction, substantially as specified.

15. A machine for forming hooks having mechanisms for feeding, cutting, blanking and folding the wire, a needle for holding the blank, a fixed guide for the needle, a vertically-movable retainer for the needle, connected mechanism operated by a single cam for moving the retainer and the needle in conjunction and mechanism for bending the nose around the needle, substantially as specified.

16. A machine for forming hooks, having mechanisms for feeding, cutting, blanking and folding the wire, an oscillating arm with a gripping-jaw for transferring the blank, a needle for holding the blank, a needle-guide with one side movable vertically to permit the oscillation of the transfer-arm, mechanism for moving the needle and the movable side of the guide, and mechanism for bending the nose around the needle, substantially as specified.

17. A machine for forming hooks, having mechanisms for feeding, cutting, blanking and folding the wire, an oscillating arm with a gripping-jaw and stopping-lug for transferring the blank, a needle for holding the blank, a vertically-movable needle-retainer, mechanism for moving the needle and the retainer, and mechanism for bending the nose around the needle, substantially as specified.

18. A machine for forming hooks having mechanisms for feeding, cutting, blanking, humping and folding the wire, an anvil, a vertically-movable punch above the anvil, an arm for transferring the blank to the anvil, a needle for holding the blank down on the anvil, a plate movable vertically adjacent to the face of the anvil and between the anvil and the needle for bending the nose upwardly, and a finger movable horizontally over the anvil for bending the nose over the needle, substantially as specified.

19. A hook-forming mechanism having an oscillating transfer-arm, an anvil, a vertically-movable punch above the anvil, a needle, a vertically-movable needle-retainer, mechanism for moving the needle and retainer in conjunction, a vertically-movable plate between the anvil and needle, a horizontally-movable finger, and mechanism for moving the plate and finger in conjunction, substantially as specified.

20. A wire-forming mechanism having a vertically-movable die, a horizontally-movable die operating in conjunction with the vertically-movable die for blanking the wire and bending one end forward, a cutter movable forward at one side of and with the horizontally-movable die, a wire-guiding quill in the plane of the cutter, a humping anvil and punch at one side of the vertically-movable die, an obliquely-movable finger movable between the anvil and punch, and horizontally-movable fingers at the other side of the horizontally-movable die, substantially as specified.

21. A wire-forming machine having a feed movable laterally only, a feed-quill in line with the feed, a cutter at the end of the quill, a vertically-movable die and a horizontally-movable die, having their operating-faces in the plane of the feed and quill, the dies being shaped to blank the wire and turn one end forward substantially forty-five degrees, a humping anvil and punch, and bending-fingers, adjacent to the blanking-dies, substantially as specified.

22. A wire-forming machine having a feed movable laterally only, a feed-quill in line with the feed, a cutter at the end of the quill, a vertically-movable die and a horizontally-movable die, having their operating-faces in the plane of the feed and quill, the dies being shaped to blank the wire and turn one end forward, substantially forty-five degrees, an obliquely-movable finger for bending one end of the wire, and a rearwardly and sidewise movable finger and a forwardly-movable finger for bending the other end of the wire, substantially as specified.

23. A wire-forming machine, having a feed, a cutter, blanking-dies, a humping punch and anvil, folding-fingers, a swaging punch and anvil, a plate for bending up the nose movable in front of the swaging-anvil, a finger movable over the anvil for bending over the nose, and a single oscillatory arm with a vertically opening and closing gripping-jaw, for carrying the blank from the blanking-dies to the swaging punch and anvil, substantially as specified.

24. A wire-forming machine having a feed, a cutter, blanking-dies, a humping punch and anvil, folding-fingers, mechanism for swaging, turning up and bending over the nose, and a single oscillatory arm with a vertically opening and closing gripping-jaw for carrying the blank in a single movement from the blanking-dies to the swaging, punching, and bending mechanism, substantially as specified.

25. A blanking mechanism for a wire-bending machine consisting of a feed, a cutter, a vertically-movable die, a horizontally-movable die, an obliquely-movable finger in front of one side of the horizontal die, a backwardly and sidewise movable finger in front of the other side of the horizontally-movable die, and a forwardly-movable finger at the side of the horizontally-movable die adjacent to the backwardly and sidewise movable die, substantially as specified.

26. A bending mechanism for a wire-forming machine consisting of an anvil and punch, a needle movable horizontally in front of the anvil, a vertically-movable guide for the needle, a vertically-movable plate between the needle-guide and the anvil, and a finger movable over the anvil and plate, substantially as specified.

27. A transfer mechanism for a wire-forming machine consisting of an oscillatory arm, bearing a fixed jaw, a movable jaw, a toothed segment and an axially-arranged rod connected with the movable jaw, mechanism engaging the segment for oscillating the arm, and mechanism connected with the rod for opening and closing the movable jaw, substantially as specified.

28. A transfer mechanism for a wire-forming machine, consisting of an oscillatory arm bearing a fixed jaw, a movable jaw, a toothed segment, an axially-arranged rod connected with the movable jaw, and a stripper-plate attached to the fixed jaw, mechanism engaging the segment for oscillating the arm, and mechanism connected with the rod for opening and closing the movable jaw, substantially as specified.

ANDREW C. CAMPBELL.

Witnesses:
NORMAN W. CUMMINS,
E. P. LINCH.